United States Patent

Kontranowski

[15] 3,675,730
[45] July 11, 1972

[54] VEHICLE WHEELED DRIVING MECHANISM

[72] Inventor: Edward S. Kontranowski, Bay City, Mich.

[73] Assignee: Aerospace America, Inc., Bay City, Mich.

[22] Filed: May 7, 1970

[21] Appl. No.: 35,417

[52] U.S. Cl. .............................................. 180/55, 180/66 F
[51] Int. Cl. .......................................................... B60k 7/00
[58] Field of Search .................. 180/65 F, 66 F, 55, 10, 43 B, 180/42–44, 1, 54 F

[56] References Cited

UNITED STATES PATENTS

| | | | |
|---|---|---|---|
| 2,110,021 | 3/1938 | Kliesrath | 180/54 F |
| 3,255,840 | 6/1966 | Tangen | 180/43 B X |
| 3,272,279 | 9/1966 | Budzich | 180/44 M |
| 3,469,648 | 9/1969 | Cannon | 180/66 F X |

Primary Examiner—Benjamin Hersh
Assistant Examiner—Milton L. Smith
Attorney—Learman, Learman & McCulloch

[57] ABSTRACT

Apparatus for driving each wheel of a multiple wheel vehicle comprises a plurality of ring gears mounted on each wheel and gear driving means associated with each wheel for driving the latter independently of or in conjunction with the remaining wheels. The driving means is reversible and includes motor means having a shaft on which is rotatably mounted one driving pinion for each ring gear, the pinion gears being constantly in mesh with their associated ring gears and being freely rotatable relatively to the motor shaft until one or the other pinion is engaged with the shaft. Coupling means is driven constantly by the motor shaft and is operable to be shifted from a neutral position in which neither pinion is driven to a driving position in which one or the other of the pinions is driven.

10 Claims, 6 Drawing Figures

INVENTOR.
EDWARD S. KONTRANOWSKI

INVENTOR.
EDWARD S. KONTRANOWSKI

INVENTOR.
EDWARD S. KONTRANOWSKI

VEHICLE WHEELED DRIVING MECHANISM

This invention relates to driving mechanisms for wheeled vehicles and more particularly to apparatus for driving each of the wheels of the vehicle independently of, or in conjunction with, one or more of the other wheels. The drive mechanism for each wheel is housed completely within the confines of its wheel and is sealed from external factors such as water, sand, dust and the like. Driving apparatus of the kind with which the invention is concerned is adapted especially for vehicles operable on rough and uneven terrain, as well as on roads. Such vehicles commonly are used by the military and by sportsmen.

Independent wheel driving mechanisms have been proposed heretofore, but not all of them have been altogether satisfactory for a number of reasons. For example, some of the known mechanisms have included objectionable, protruding transmitting drives, differentials, transmission linkages, and the like which decrease leg room and passenger comfort. Others of the known devices have required front or rear, or both, transverse axles, differentials, and other heavy, expensive apparatus, including complicated brake systems and steering linkages which add to the cost and weight of such vehicles and, in many instances, limit their use.

A wheel-driving mechanism which overcomes to a large extent the disadvantages of many of the prior art proposals is disclosed in copending application Ser. No. 801,254, filed Feb. 24, 1969, now U.S. Pat. No. 3,581,682. The apparatus disclosed herein constitues an improvement over the apparatus disclosed in the above identified application.

An object of this invention is to provide improved driving mechanism for each wheel of a multiple wheel vehicle and wherein each driving mechanism is wholly contained within its associated wheel, thereby eliminating all need for drive transmitting trains, differentials, transmissions, linkages, and other conventional appurtenances.

Another object of the invention is to provide mechanism of the kind referred to which eliminates the necessity of transverse front and rear axles.

A further object of the invention is to provide an independent drive mechanism for each wheel of a vehicle and which is of simplified construction, thereby minimizing the costs of manufacture and maintenance.

Other objects and advantages of the invention will be pointed out specifically or will become apparent from the following description when it is considered in conjunction with the appended claims and the accompanying drawings, in which:

Figures 1, 2:
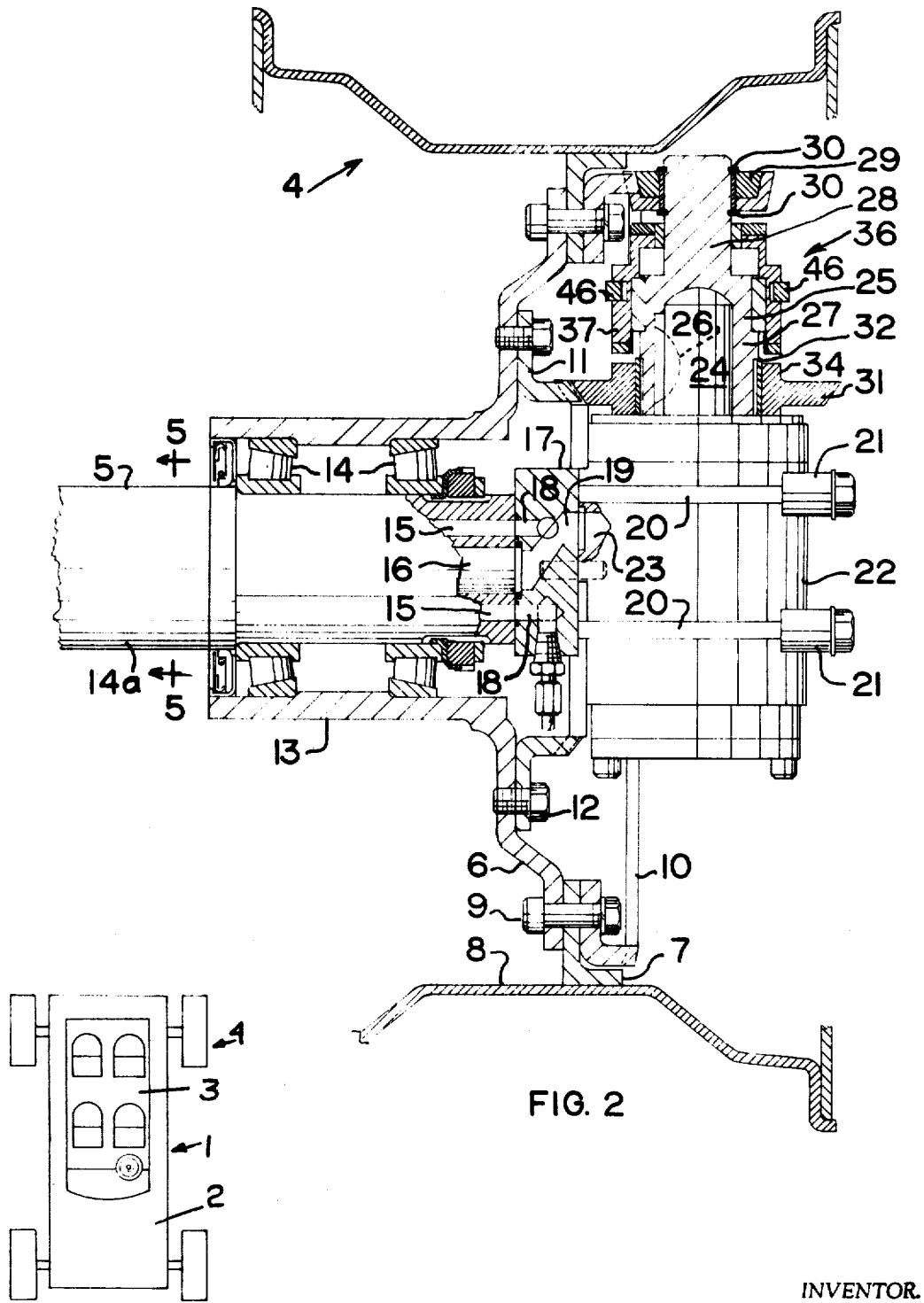
FIG. 1 is a diagrammatic view of a four wheeled vehicle equipped with apparatus constructed in accordance with the invention.
FIG. 2 is an enlarged, vertical sectional view through a typical wheel and illustrating the arrangement of the drive mechanism within the confines of the wheel, certain parts being broken away for clarity.

Apparatus constructed in accordance with the invention is adapted for use in conjunction with a vehicle having a body 1 including an engine compartment 2, a passenger compartment 3 and a plurality of wheels 4. Each wheel 4 is journaled on its own axle 5 in a manner presently to be described, and each axle is suspended from the body 1 in any well known, conventional manner. Certain ones of the wheels 4 will be steerable by steering apparatus (not shown) of conventional construction accessible to the vehicle driver.

Figure 3:
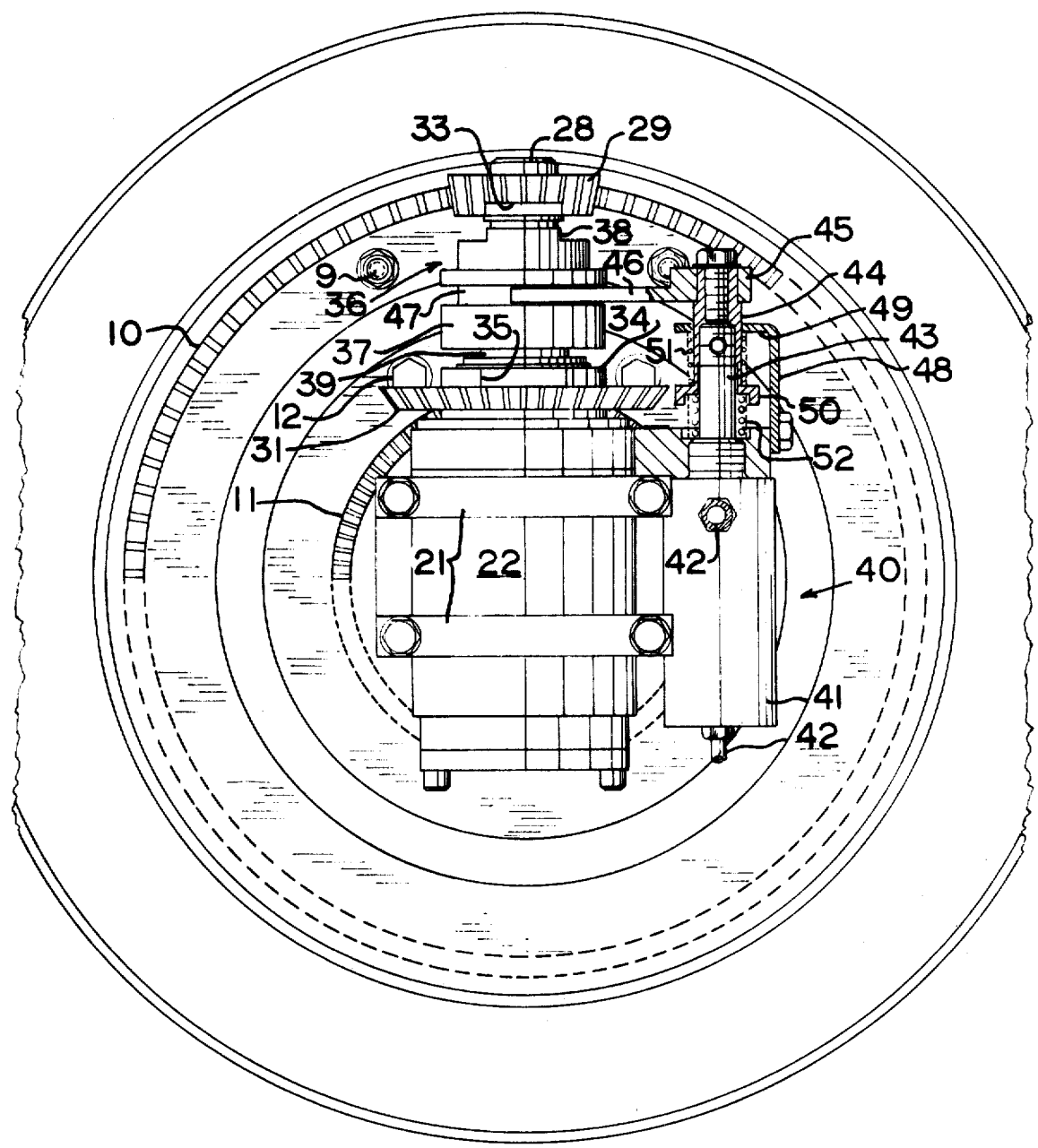
FIG. 3 is a side elevational view, partly in section, of the apparatus as shown in FIG. 2.
Figure 5:
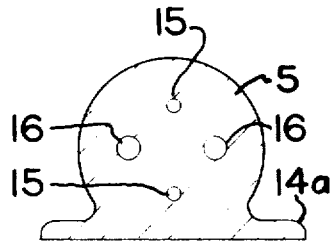
FIG. 5 is a sectional view taken on the line 5—5 of FIG. 2.
Figure 4:
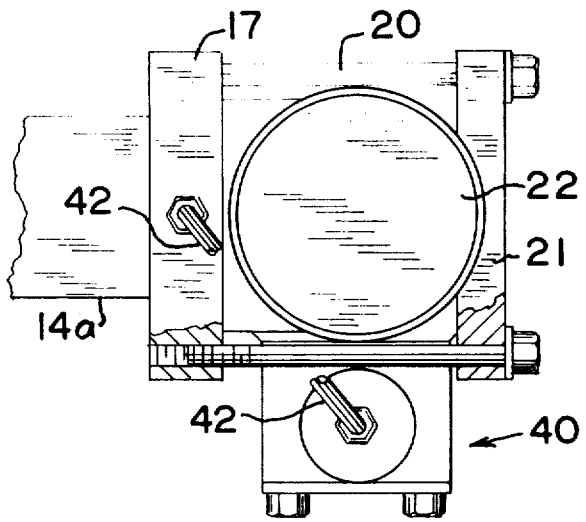
FIG. 4 is a bottom plan view, partly broken away, of apparatus shown in FIG. 2.

A typical wheel 4 is illustrated in FIGS. 2 and 3 and comprises a disk 6 to the periphery of which is secured a flange 7 which, in turn, is secured to a tire mounting rim 8. The flange 7 is secured to the disk 6 by a plurality of bolts 9 which also secure to the disk a ring gear 10.

Concentric with the ring gear 10 is a radially inner ring gear 11 which is secured to the disk 6 by bolts 12. The disk is provided with a central hub 13 for the accommodation of a bearing assembly 14 by means of which the wheel is journaled for rotation on the axle 5.

The axle 5 is an extrusion having a rigidifying flange 14a at one side. The axle is provided with two pairs of fluid passages 15 and 16 for a purpose presently to be explained.

Inwardly of the hub 13 the axle 5 is fixed to a plate 17 having ports 18 in alignment with the passages 15 and other ports 19 in alignment with the passages 16.

Fixed to the plate 17 is a number of anchor bolts 20 provided at their free ends with clamp bars 21 which serve to clamp a reversible hydraulic motor 22 of known construction to the plate 17. The motor 22 is provided with fluid passages 23 which communicate with the ports 19 so as to enable fluid to pass from one of the passages 16 through the motor and thence to the other passage 16. Within the motor is a fluid driven rotor (not shown) to which is connected a rotary shaft 24. The shaft 24 is rotatable in a selected one of either of two directions, depending upon the direction of flow of fluid through the motor 22.

A driving member 25 is keyed as at 26 to the shaft 24 so as to rotate with the latter. The driving member 25 has an enlarged, hollow base portion 27 which is fitted over the shaft 24 and a reduced portion or extension 28 which projects from the portion 27. Journaled on the extension 28 for rotation relative thereto is a driving pinion 29, the pinion being fixed against axial movement by means of clips 30. The pinion gear 29 has teeth which constantly mesh with the teeth of the ring gear 10. Journaled on the base 27 of the driving member 25 is a driving pinion 31 having teeth which constantly are in mesh with the teeth of the ring gear 11. Axial movement of the pinion 31 is prevented by a clip 32.

As is best shown in FIG. 3, the periphery of the pinion 29 is provided with circumferentially spaced notches 33 and the pinion 31 has a hub 34 provided with similar notches 35.

Axially shiftable coupling means 36 comprises a sleeve 37 splined to the base 27 of the driving member 25 for rotation with the latter. At its upper end the sleeve 37 has driving lugs 38 adapted to seat in the notches 33 of the pinion 29, and at its lower end the sleeve 37 has similar lugs 39 adapted to seat in the notches 35 of the pinion 31. The axial length of the sleeve 37, including the lugs 38 and 39, is less than the axial spacing between the gear 29 and the gear hub 34 so as to enable the coupling 36 to occupy a neutral position in which neither of the gears is engaged by their respective driving lugs.

Shifting means 40 is provided to effect shifting of the coupling member 36 from any one of its positions to the others and comprises a cylinder 41 having fluid conduits 42 which communicate with the passages 15 via the ports 18. Within the cylinder 41 is a piston (not shown) to which is connected one end of a piston rod 43. Fixed on the piston rod 43 is an end cap 44 to which is secured a shifter plate 45 having a pair of arms 46 which straddle the coupling sleeve 37 and are accommodated in an annular groove 47.

Fixed to the cylinder 41 is an L-shaped guide arm 48 having a flange 49 provided with an opening through which the cap 44 slidably extends. The lower end of the cap 44 includes a flange 50. Between the flange 50 and the arm 49 is a compression spring 51, and between the flange 50 and the base of the cylinder 41 is another compression spring 52. The springs 51 and 52 act on the piston rod 43 so as normally to maintain the latter in such position that the coupling member 36 is in a neutral position in which neither of the sets of driving lugs 38 and 39 is in engagement with their respective pinions 29 and 31. However, introduction of fluid to the cylinder 41 in such direction as to displace the piston rod 43 radially outwardly, or upwardly from the position shown in FIG. 3, will effect corresponding movement of the coupling member 36 so as to engage the driving lugs 38 with the pinion 29. Conversely, introduction of fluid to the cylinder 41 in such direction as to displace the piston rod 43 downwardly from the position shown in FIG. 3 will effect engagement of the driving lugs 39 with the pinion 31.

Operating means for controlling the operation of the driving mechanism is designated generally by the reference character 53 and comprises a hydraulic torque converter 54 driven by the drive shaft S of the vehicle engine E. The converter 54 is connected by two conduits 55 and 56 to a distribution block 57. Within the block 57 is a passage which communicates with each of four tubes 58, 59, 60 and 61 and with the conduit 55. Within the block 57 is a second passage which communicates with each of four tubes 62–65 and with the conduit 56. The tubes 58 and 62 communicate with the passages 16 associated with the driving mechanism for one wheel, the tubes 59 and 63 communicate with the passages 16 associated with another wheel, and so on.

A second distribution block 66 forms part of the operating means 53 and includes a passage which communicates with the conduit 55 via a tube 67 and a second passage which communicates with the conduit 56 via a tube 68. In communication with the tube 67 are four tubes 69–72, and in communication with the tube 68 are four tubes 73–76. The tubes 69 and 73 communicate with the passages 15 associated with one wheel, the tubes 70 and 74 communicate with the passages 15 associated with a second wheel, and so on.

The converter 54 is adapted to discharge fluid therefrom either through the conduit 55 or the conduit 56, or through neither conduit, under the control of a manually operated valve (not shown) of known construction and having an operating handle 77. Fluid is adapted to be introduced into the distributor 66 via the tube 67 or the tube 68, or neither, under the control of a valve (not shown) of known construction and operated by a handle 78. The operation of the control apparatus 53 will become apparent from a description of the operation of the illustrated wheel driving mechanism.

To condition the apparatus for operation, the engine E is started so as to drive the shaft S and effect operation of the torque converter 54. When the valve handle 77 is in the full line, intermediate position shown in FIG. 6, fluid flows from the converter 54 through the distributor 57 and returns directly to the converter. Thus, the several driving motors 22 are not driven by the converter 54, but instead, are locked in a non-rotatable condition. When the valve handle 77 is rotated 90° to the left, however, fluid will be discharged from the converter 54 into the distributor 57 via the conduit 55 and fluid will be discharged from the distributor 57 to the distributor 66 via the tube 67. Fluid introduced to the distributor 57 will be discharged from the latter via the tube 58 into one of the passages 16 and thence to the associated hydraulic motor 22 so as to effect rotation of the shaft 24 in one direction and, consequently, rotation of the driving member 25 in the same direction. As long as the coupling member 36 is in its neutral position, however, neither of the pinions 29 or 31 will be driven. Consequently, the wheel 4 will remain at rest.

Fluid discharged from the motor 22 is returned via the other passage 16 to the tube 62 whence it returns to the torque converter 54 via the conduit 56.

Figure 6:
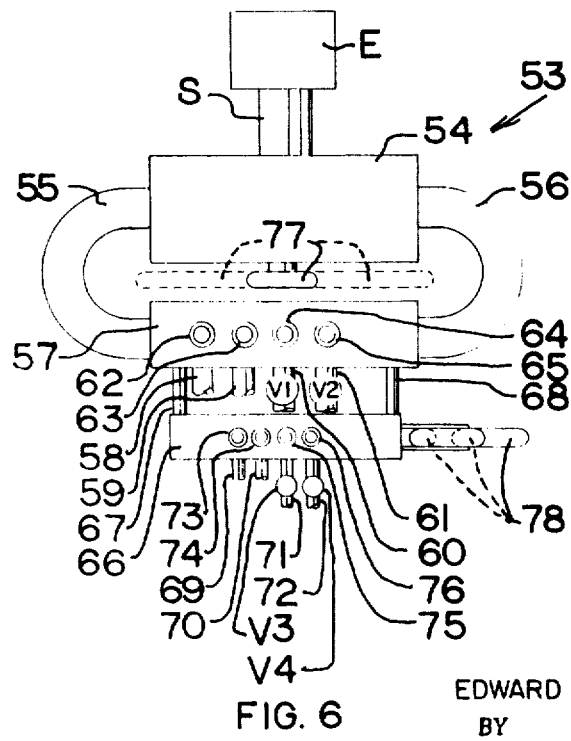
FIG. 6 is a diagrammatic view of pressure fluid operating means and control means therefor.

When the valve handle 77 is in the left-hand position shown in FIG. 6, fluid from the distributor 57 will be discharged to the driving mechanism of a second wheel via the tube 59 and returned via the tube 63. Fluid also will be discharged from the distributor 57 via the tubes 60 and 61 to third and fourth wheel driving mechanisms and returned to the block via the tubes 64 and 65, respectively. In the tubes 60 and 61, however, are located manually operable valves V–1 and V–2 by means of which operation of the driving mechanisms associated with the tubes 60 and 61 may be disabled. In practice, the tubes 60 and 61 will be associated with the front wheels of a vehicle so as to enable the front wheels to be driven or freewheeling as may be desired by the vehicle operator.

As long as the valve operating handle 77 remains in the left-hand position shown in FIG. 6, the wheels will be capable of being driven by their associated driving mechanisms in one direction. When the handle 77 is rotated through 180°, however, fluid is discharged from the converter 54 through the conduit 56 to the block 57, and is discharged from the block 57 through the lines 62–65 to the respective driving mechanisms. Fluid from the driving mechanisms is returned to the block 57 via the lines 58–61 and thence through the conduit 55 to the converter 54. In this instance, therefore, the driving motors 22 associated with the respective wheel driving mechanisms will be rotated in the reverse direction from that described earlier.

The rate of movement of the valve handle 77 from one open position to the other from the neutral or closed position determines the rate at which the respective drive mechanisms are accelerated. Conversely, the rate of movement of the valve handle 77 from its open positions to its closed position determines the rate at which the respective driving mechanisms are slowed or braked.

The position of the pinions 29 and 31 with respect to their respective ring gears 10 and 11 is determined by the position of the valve handle 78. When the latter is in the full line position shown in FIG. 6, the piston rod 43 associated with the cylinder 41 is in its neutral or intermediate position. As a result, the shifter plate 45 will be in a neutral position such that neither of the pinions 29 or 31 is engaged by the associated driving lugs of the coupling member 36. When the handle 78 is moved 90° to the left from the full line position shown in FIG. 6, however, fluid is delivered via the tubes 69–72 to the associated cylinders 41 so as to project the piston rods 43 and effect vertical shifting of the coupling members 36, thereby engaging the driving lugs 38 with the pinions 29 and effecting rotation in one direction of all of the wheels 4 via the ring gears 10.

When the handle 78 is shifted 90° to the right from the full line position shown in FIG. 6, the hydraulic forces acting on the associated cylinders 41 will be reversed, effecting retraction of the associated piston rods 43 and shifting of the coupling means 36 in such direction as to engage the driving lugs 39 with the pinions 31, and thereby effect rotation of the wheels 4 via the ring gears 11.

As will be apparent from FIGS. 2 and 3, the pinions 29 and 31 are of different diameters. Consequently, the speed at which the wheels 4 are driven upon engagement of the pinions 29 with the coupling members 36 will be different from the rate at which the wheels are driven upon engagement of the pinions 31 with the coupling members.

In those instances when it is not desired to operate all of the wheel-driving mechanisms, the coupling members 36 associated with the driving motors 22 which have been disabled by operation of the valves V–1 and V–2 may be located and locked in their neutral positions by manipulation of valves V–3 and V–4 in tubes 71 and 72, respectively, which will preclude the application of hydraulic forces on the associated cylinders 41, regardless of the position of the operating handle 78. Thus, whenever the remaining wheel driving mechanisms are shifted into their neutral, forward or reverse positions, there will be no change in the condition of the mechanisms which have been neutralized by manipulation of the valves V–3 and V–4.

The disclosed embodiment is representative of the presently preferred form of the invention, but is intended to be illustrative rather than definitive thereof. The invention is defined in the claims.

I claim:

1. Wheel driving apparatus comprising a wheel journaled for rotation; a pair of radially spaced, concentric, annular gears carried by said wheel; a pair of pinion gears; means mounting one of said pinion gears in mesh with one of said annular gears and the other of said pinion gears in mesh with the other of said annular gears; rotatable motor means; coupling means engageable with either of said pinion gears; means mounting said coupling means between said pinion gears for movements to effect coupling and uncoupling of a selected one of either of said pinion gears to and from said motor means; and operating means for moving said coupling means.

2. The apparatus set forth in claim 1 wherein motor means is reversible.

3. The apparatus set forth in claim 1 wherein said operating means comprises reciprocable piston means.

4. The apparatus set forth in claim 1 including means normally biasing said coupling means to a position in which said pinion means is disconnected from said motor means.

5. The apparatus set forth in claim 1 wherein said coupling means comprises a body having driving lugs movable into and out of notches formed in said pinion gears.

6. The apparatus set forth in claim 1 wherein each of said pinion gears has a different diameter.

7. The apparatus set forth in claim 1 wherein said coupling means is driven constantly by said motor means.

8. The apparatus set forth in claim 1 wherein said operating means comprises reciprocable shifting means for shifting said coupling means radially of said annular gears.

9. The apparatus set forth in claim 8 including means biasing said shifting means to a position in which said coupling means is intermediate both of said pinion gears and is coupled to neither.

10. Wheel driving apparatus comprising a wheel journaled for rotation; a plurality of concentric, annular gears carried by said wheel; a plurality of pinion gears corresponding to the number of annular gears; means mounting each of said pinion gears in mesh with an annular gear; rotatable motor means; coupling means; means mounting said coupling means for movements to effect coupling and uncoupling of a selected one of said pinion gears to and from said motor means; shifting means for effecting such movements of said coupling means; and means biasing said shifting means to a position in which said coupling means is intermediate both of said pinion gears and is coupled to neither.

* * * * *